United States Patent
Liang et al.

(10) Patent No.: US 10,843,975 B2
(45) Date of Patent: Nov. 24, 2020

(54) SPARK PLASMA SINTERED POLYCRYSTALLINE DIAMOND

(71) Applicant: Halliburton Energy Services, Inc., Houston, TX (US)

(72) Inventors: Qi Liang, Richmond, VA (US); William Brian Atkins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 365 days.

(21) Appl. No.: 15/742,468

(22) PCT Filed: Aug. 5, 2015

(86) PCT No.: PCT/US2015/043791
§ 371 (c)(1),
(2) Date: Jan. 5, 2018

(87) PCT Pub. No.: WO2017/023312
PCT Pub. Date: Feb. 9, 2017

(65) Prior Publication Data
US 2018/0208511 A1    Jul. 26, 2018

(51) Int. Cl.
*B24B 1/00* (2006.01)
*C04B 35/645* (2006.01)
(Continued)

(52) U.S. Cl.
CPC .......... *C04B 35/645* (2013.01); *C04B 35/528* (2013.01); *E21B 10/56* (2013.01);
(Continued)

(58) Field of Classification Search
USPC .................. 51/293, 295, 307, 309
See application file for complete search history.

(56) References Cited

U.S. PATENT DOCUMENTS 4,743,512 A * 5/1988 Marlowe ............... B22F 1/0003
428/552
4,919,974 A    4/1990 McCune et al.
(Continued)

FOREIGN PATENT DOCUMENTS

CN        1320108      10/2001
CN        102356211     2/2012
(Continued)

OTHER PUBLICATIONS

Kodash et al. ("Field-assisted sintering of Ni nanopowders." Materials Science and Engineering: A 385.1-2 (2004): 367-371). (Year: 2004).*
(Continued)

*Primary Examiner* — James E McDonough
(74) *Attorney, Agent, or Firm* — Baker Botts L.L.P.

(57) ABSTRACT

The present disclosure relates a spark plasma sintered polycrystalline diamond and methods of spark plasma sintering leached polycrystalline diamond. Spark plasma sintering produces plasma from a reactant gas found in the pores left by catalyst removal from leached polycrystalline diamond. The plasma forms diamond bonds and/or carbide structures in the pores, which may produce polycrystalline diamond that is has a higher impact strength than the leached polycrystalline diamond or other improved properties.

18 Claims, 4 Drawing Sheets

(51) Int. Cl.
  *C04B 35/528* (2006.01)
  *E21B 10/567* (2006.01)
  *E21B 10/56* (2006.01)
  *B24D 3/00* (2006.01)
  *B24D 3/02* (2006.01)
  *B24D 11/00* (2006.01)
  *B24D 18/00* (2006.01)
  *C09K 3/14* (2006.01)
  *B22F 7/06* (2006.01)
  *C22C 26/00* (2006.01)
  *E21B 10/55* (2006.01)

(52) U.S. Cl.
  CPC ............ *E21B 10/567* (2013.01); *B22F 7/062* (2013.01); *C04B 2235/427* (2013.01); *C04B 2235/614* (2013.01); *C04B 2235/6562* (2013.01); *C04B 2235/6567* (2013.01); *C04B 2235/666* (2013.01); *C22C 2026/006* (2013.01); *E21B 10/55* (2013.01)

(56) References Cited

U.S. PATENT DOCUMENTS

| | | | |
|---|---|---|---|
| 5,116,568 A | 5/1992 | Sung et al. | |
| 5,158,148 A | 10/1992 | Keshavan | |
| 5,349,154 A | 9/1994 | Harker et al. | |
| 5,584,045 A * | 12/1996 | Tanabe ................. | C23C 16/01 428/547 |
| 5,718,736 A | 2/1998 | Onishi et al. | |
| 6,214,079 B1 | 4/2001 | Kear et al. | |
| 6,344,149 B1 | 2/2002 | Oles | |
| 6,861,137 B2 | 3/2005 | Griffin et al. | |
| 7,407,012 B2 | 8/2008 | Keshavan et al. | |
| 7,528,413 B2 | 5/2009 | Yoshida et al. | |
| 7,533,740 B2 | 5/2009 | Zhang et al. | |
| 8,080,071 B1 | 12/2011 | Vail | |
| 8,123,879 B1 * | 2/2012 | Bellitto ................. | C06B 33/08 149/16 |
| 8,372,334 B2 | 2/2013 | Voronin et al. | |
| 8,414,986 B2 | 4/2013 | Keshavan | |
| 8,617,274 B2 | 12/2013 | Zhan | |
| 8,662,209 B2 | 3/2014 | Dourfaye et al. | |
| 8,720,612 B2 | 5/2014 | Corbett et al. | |
| 8,727,042 B2 | 5/2014 | DiGiovanni | |
| 8,727,043 B2 | 5/2014 | Zhang et al. | |
| 8,919,463 B2 | 12/2014 | Setlur et al. | |
| 9,447,642 B2 | 9/2016 | Bellin et al. | |
| 9,862,606 B1 | 1/2018 | Cook et al. | |
| 2002/0119303 A1 | 8/2002 | Pender et al. | |
| 2005/0044800 A1 | 3/2005 | Hall et al. | |
| 2005/0050801 A1 | 3/2005 | Cho et al. | |
| 2007/0029114 A1 | 2/2007 | Middlemiss | |
| 2009/0152018 A1 | 6/2009 | Sani | |
| 2010/0206941 A1 | 8/2010 | Egan et al. | |
| 2010/0243336 A1 | 9/2010 | Dourfaye et al. | |
| 2011/0024201 A1 * | 2/2011 | Scott ................... | E21B 10/5735 175/428 |
| 2011/0036641 A1 | 2/2011 | Lyons | |
| 2011/0083908 A1 | 4/2011 | Shen et al. | |
| 2011/0226532 A1 | 9/2011 | Jonker et al. | |
| 2012/0097457 A1 * | 4/2012 | Setlur ................. | B22F 3/16 175/428 |
| 2012/0291361 A1 | 11/2012 | Frushour | |
| 2013/0068450 A1 | 3/2013 | Phadke et al. | |
| 2013/0086847 A1 | 4/2013 | Digiovanni et al. | |
| 2013/0133957 A1 | 5/2013 | Belnap et al. | |
| 2014/0020823 A1 | 1/2014 | Montross | |
| 2014/0060937 A1 | 3/2014 | Konovalov et al. | |
| 2014/0123565 A1 | 5/2014 | Zhan et al. | |
| 2014/0262452 A1 * | 9/2014 | Cok ..................... | H05K 3/1258 174/253 |
| 2014/0360103 A1 | 12/2014 | DiGiovanni et al. | |
| 2017/0183235 A1 | 6/2017 | Liang et al. | |

FOREIGN PATENT DOCUMENTS

| | | |
|---|---|---|
| CN | 103038380 | 4/2013 |
| CN | 103260799 | 8/2013 |
| CN | 104712252 | 6/2015 |
| EP | 1760165 | 3/2007 |
| WO | 0018702 | 4/2000 |
| WO | 01/79583 | 10/2001 |
| WO | 2010/034492 | 4/2010 |
| WO | 2011141898 | 11/2011 |
| WO | 2012/158322 | 11/2012 |

OTHER PUBLICATIONS

"Polycrystalline Diamond Cutters Produced via Spark Plasma Infiltration." National Oilwell Varco, Oct. 10, 2013; 2 pages.
International Search Report received for PCT Patent Application No. PCT/US2015/043791, dated May 3, 2016; 12 pages.
International Search Report received for PCT Patent Application No. PCT/US2015/043802, dated May 3, 2016; 12 pages.
Zhao, Yucheng, and Mingzhi Wang. "Effect of sintering temperature on the structure and properties of polycrystalline cubic boron nitride prepared by SPS." Journal of materials processing technology 209.1 (2009): 355-359; 14 pages.
Office Action for Chinese Application No. 201580081302.9, dated Jan. 28, 2019, no English translation; 8 pages.
Office Action for Chinese Application No. 201580081302.9, dated Jul. 11, 2019, no English translation; 6 pages.
International Preliminary Report on Patentability for PCT Patent Application No. PCT/US2015/043791, dated Feb. 15, 2018; 8 pages.
International Preliminary Report on Patentability for PCT Patent Application No. PCT/US2015/043802, dated Feb. 15, 2018; 8 pages.
PDC drill bits, petrowiki.org/PDC_drill_bits, 3 pages, Jan. 19, 2016.
Fang, Z. Zak, et al. "Synthesis, sintering, and mechanical properties of nanocrystalline cemented tungsten carbide—a review." International Journal of Refractory Metals and Hard Materials 27.2 (2009): 288-299; 12 pages.
International Search Report and Written Opinion, Applicaton No. PCT/US2015/043771; 11 pgs, dated Aug. 5, 2015.

\* cited by examiner

SPARK PLASMA SINTERED POLYCRYSTALLINE DIAMOND

RELATED APPLICATIONS

This application is a U.S. National Stage Application of International Application No. PCT/US2015/043791 filed Aug. 5, 2015, which designates the United States, and is incorporated herein by reference in its entirety.

TECHNICAL FIELD

The present disclosure relates to polycrystalline diamond and systems and methods for producing polycrystalline diamond.

BACKGROUND

Polycrystalline diamond compacts (PDCs), particularly PDC cutters, are often used in earth-boring drill bits, such as fixed cutter drill bits. PDCs include diamond formed under high-pressure, high-temperature (HTHP) conditions in a press. In many cases, a PDC includes polycrystalline diamond formed and bonded to a substrate in as few as a single HTHP press cycle. A sintering aid, sometimes referred to in the art as a catalysing material or simply a "catalyst," is often included in the press to facilitate the diamond-diamond bonds that participate both in forming the diamond and, optionally, in bonding the diamond to the substrate.

During use (e.g. while drilling), polycrystalline diamond cutters become very hot, and residual sintering aid in the diamond can cause problems such as premature failure or wear due to factors including a mismatch between the coefficients of thermal expansion (i.e. CTE mismatch) of diamond and the sintering aid. To avoid or minimize this issue, all or a substantial portion of the residual diamond sintering aid is often removed from the polycrystalline diamond prior to use, such as via a chemical leaching process, an electrochemical process, or other methods. Polycrystalline diamond from which at least some residual sintering aid has been removed is often referred to as leached regardless of the method by which the diamond sintering aid was removed. Polycrystalline diamond sufficiently leached to avoid graphitization at temperatures up to 1200° C. at atmospheric pressure is often referred to as thermally stable. PDCs containing leached or thermally stable polycrystalline diamond are often referred to as leached or thermally stable PDCs, reflective of the nature of the polycrystalline diamond they contain.

Leached polycrystalline diamond, particularly thermally stable polycrystalline diamond, has improved wear resistance as compared to unleached polycrystalline diamond. Improvements in wear resistance are typically related to the degree of leaching. For instance wear resistance improves with greater depth of leaching from the polycrystalline diamond working surface. However, leaching leaves pores in the polycrystalline diamond where the diamond sintering aid was previously located. These pores reduce the impact strength of leached polycrystalline diamond as compared to un-leached polycrystalline diamond. In addition, if polycrystalline diamond contains leached and un-leached portions, pores contribute to stress between these portions, such that delamination, buckling, or cracking of the leached polycrystalline diamond portion is common. These stresses and resulting effects can lead to failure of the polycrystalline diamond, even under very minimal impact load.

BRIEF DESCRIPTION OF THE DRAWINGS

A more complete and thorough understanding of the present embodiments and advantages thereof may be acquired by referring to the following description taken in conjunction with the accompanying drawings, which are not to scale, in which like reference numbers indicate like features, and wherein.

DETAILED DESCRIPTION

The present disclosure relates to spark plasma sintered polycrystalline diamond and systems and methods for producing spark plasma sintered polycrystalline diamond. Spark plasma sintered polycrystalline diamond is leached polycrystalline diamond, including thermally stable polycrystalline diamond, in which at least some pores left by leaching the diamond sintering aid have been at least partially filled with diamond bonds and/or carbide structures deposited through the spark plasma sintering process. Due to this pore filling, spark plasma sintered polycrystalline diamond is denser than the leached polycrystalline diamond prior to spark plasma sintering. In addition, spark plasma sintered polycrystalline diamond may have a higher impact strength than the leached polycrystalline diamond prior to spark plasma sintering. In addition, impact strength, wear resistance, or other properties affected by the degree of bonding in the polycrystalline diamond may be improve because both the diamond bonds and carbide structures provide additional covalent bonds within the polycrystalline diamond. Furthermore, spark plasma sintered polycrystalline diamond is more thermally stable than unleached polycrystalline diamond with similar pore filling by the diamond sintering aid because carbide structures and diamond bonds have a coefficient of thermal expansion closer to that of the polycrystalline diamond than diamond sintering aids do.

Figure 1A:
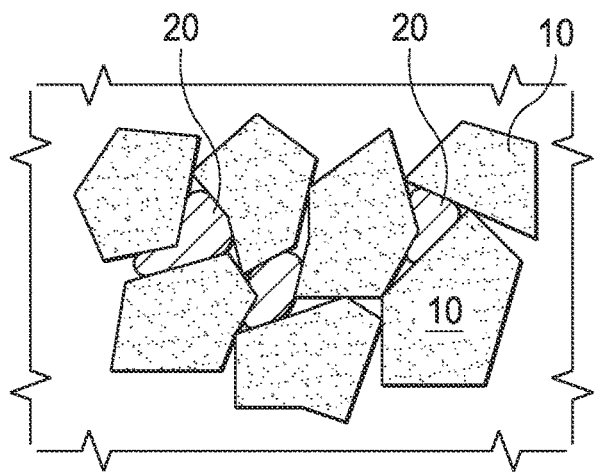
FIG. 1A is a schematic drawing in cross-section of unleached polycrystalline diamond.
Figure 1B:
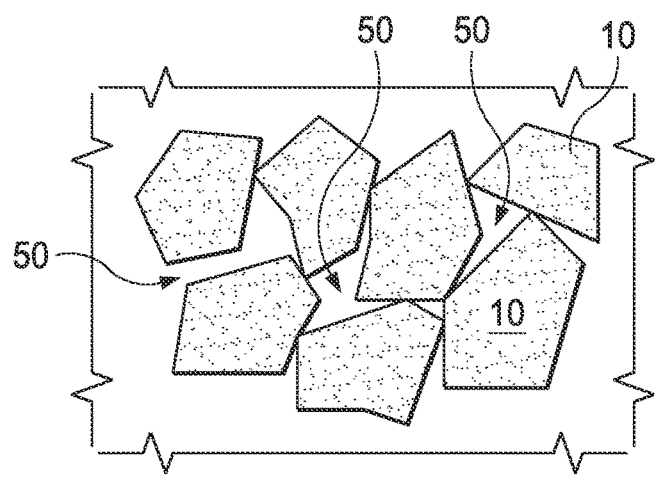
FIG. 1B is a schematic drawing in cross-section of leached polycrystalline diamond.

FIG. 1A depicts unleached polycrystalline diamond. Diamond sintering aid 20, in the form of a catalyst, is located between diamond grains 10. After leaching, as illustrated by fully leached polycrystalline diamond of FIG. 1B, pores 50 are present where diamond sintering aid 20 was previously located. Although FIG. 1B illustrates fully leached, thermally stable polycrystalline diamond, partially leached polycrystalline diamond or unleached polycrystalline diamond with pores may also be used with spark plasma sintering processes disclosed herein. The leached portion of the polycrystalline diamond may extend to any depth from any surface or all surfaces of the polycrystalline diamond or may even include all of the polycrystalline diamond. Less than 2% or less than 1% of the volume of the leached portion of the leached or thermally stable polycrystalline diamond is occupied by the diamond sintering aid, as compared to between 4% and 8% of the volume in unleached polycrystalline diamond.

Figure 1C:
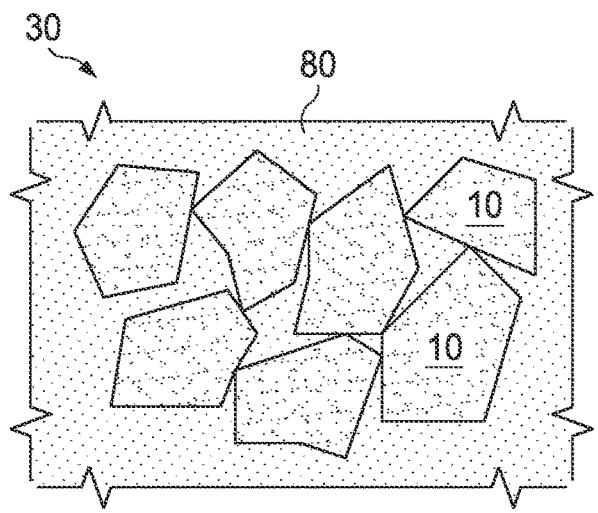
FIG. 1C is schematic drawing in cross-section of leached polycrystalline diamond in the presence of a reactant gas prior to spark plasma sintering.

During a spark plasma sintering process, the pores 50 are filled with reactant gas 80, as shown in FIG. 1C. Although all pores 50 are illustrated as filled in FIG. 1C, not all pores need necessarily be filled. At least a portion of the pores, at least 25% of the pores, at least 50% of the pores, at least 75% of the pores, or at least 99% of the pores may be filled with reactant gas. Pore filling is evidenced by the formation of diamond bonds or carbide structures in the pores after spark plasma sintering.

Figure 1D:
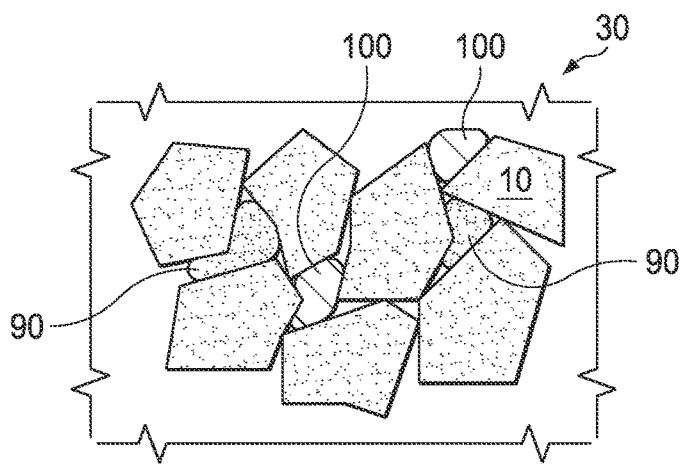
FIG. 1D is a schematic drawing in cross-section of spark plasma sintered polycrystalline diamond.

Finally, in spark plasma sintered polycrystalline diamond illustrated in FIG. 1D, pores 50 left by diamond sintering aid removal are filled with diamond bonds 90 and/or carbide structures 100 that are formed from reactant gas 80.

In FIG. 1D, diamond bonds 90 are illustrated as distinguishable from diamond grains 10, but they may be sufficiently similar and/or may fill any pores so thoroughly that they are not distinguishable.

Furthermore, although each filled pore in FIG. 1D is illustrated as not entirely filled, it is possible for each filled pore to be substantially filled. Furthermore, although FIG. 1D illustrates some pores as unfilled, the disclosure includes embodiments in which diamond bonds and/or carbide structures fill at least 25% of the pores, at least 50% or the pore, at least 75% of the pores, or at least 99% of the pores in the polycrystalline diamond.

A higher percentage of filled pores and more complete filling of filled pores may result in greater improvements in impact strength or other polycrystalline diamond properties.

Diamond grains 10 may be of any size suitable to form polycrystalline diamond 30. They may vary in grain size throughout the polycrystalline diamond or in different regions of the polycrystalline diamond.

Reactant gas 80 may include a carbide-forming metal in gas form alone or in combination with hydrogen gas ($H_2$) and/or a hydrocarbon gas. The carbide-forming metal may include zirconium (Zr), titanium (Ti), silicon (Si), vanadium (V), chromium (Cr), boron (B), tungsten (W), tantalum (Ta), manganese (Mn), nickel (Ni), molybdenum (Mo), halfnium (Hf), rehenium (Re) and any combinations thereof. The gas form may include a salt of the metal, such as a chloride, or another compound containing the metal rather than the unreacted element, as metal compounds often form a gas more readily than do unreacted elemental metals. The hydrocarbon gas may include methane, acetone, methanol, or any combinations thereof.

Carbide structures 100 may include transitional phases of metal elements, such as zirconium carbide (ZrC), titanium carbide (TiC), silicon carbide (SiC), vanadium carbide (VC), chromium carbide (CrC), boron carbide (BC), tungsten carbide (WC), tantalum carbide (TaC), manganese carbide (MnC), nickel carbide (NiC), molybdenum carbide (MoC), halfnium carbide (HfC), rhenium carbide (ReC), and any combinations thereof.

Figure 2:
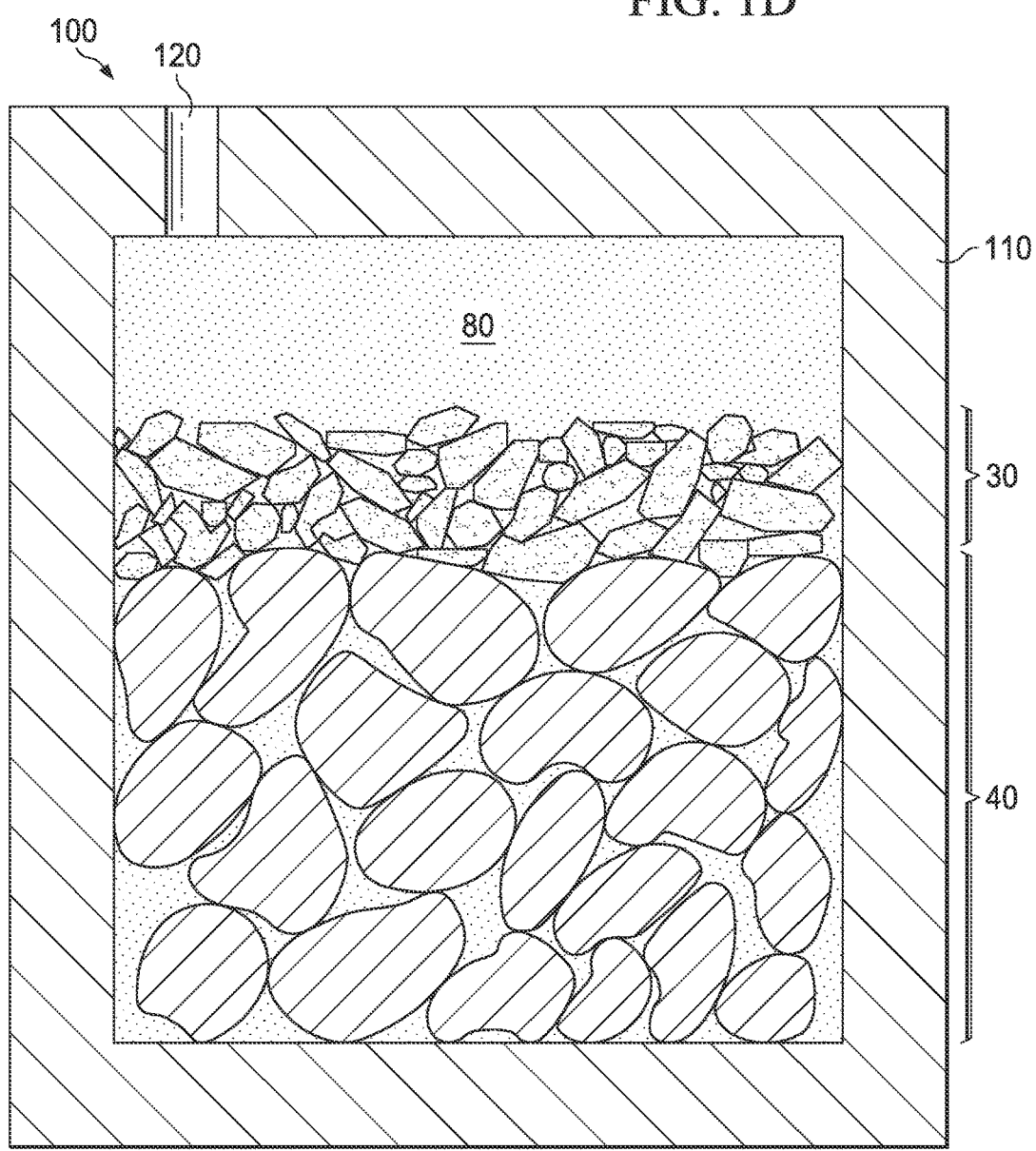
FIG. 2 is a schematic drawing in cross-section of a spark plasma sintering assembly.

Prior to spark plasma sintering, polycrystalline diamond 30 with pores, such as leached or thermally stable polycrystalline diamond, is placed in a spark plasma sintering assembly 200, such as the assembly of FIG. 2. The assembly includes a sealed sintering can 110 containing polycrystalline diamond 30 and substrate 40 with a reactant gas 80 adjacent to polycrystalline diamond 30. Polycrystalline diamond 30 may be polycrystalline diamond leached to a certain depth from a working surface, a side surface, or any other surface. It may include thermally stable polycrystalline diamond.

Substrate 40 may be the substrate on which leached polycrystalline diamond 30 was formed, or a second substrate to which leached polycrystalline diamond 30 was attached after leaching. Substrate 40 is typically a cemented metal carbide, such as tungsten carbide (WC) grains in a binder or infiltrant matrix, such as a metal matrix. Although FIG. 2 depicts an assembly including a substrate 40, the assembly may also omit a substrate, which may be attached later, if needed.

Sealed sintering can 110 includes port 120 through which reactant gas 80 enters sealed sintering can 110 before it is sealed. Reactant gas 80 may be introduced into sealed sintering can 110 before it is placed in spark plasma sintering assembly 200 of FIG. 3 by placing can 110 in a vacuum to remove internal air, then pumping reactant gas 80 into the vacuum chamber. The vacuum chamber may be different from chamber 210 of spark plasma sintering assembly 200, or it may be chamber 210. Port 120 may be sealed with any material able to withstand the spark plasma sintering process, such as a braze alloy.

Sealed sintering can 110 is typically formed from a metal or metal alloy or another electrically conductive material. However, it is also possible to form sealed sintering can from a non-conductive material and then place it within a conductive sleeve, such as a graphite sleeve. A conductive sleeve or non-conductive sleeve may also be used with a conductive sintering can 110 to provide mechanical reinforcement. Such sleeves or other components attached to or fitted around all or part of sintering can 110 may be considered to be part of the sintering can.

Figure 3:
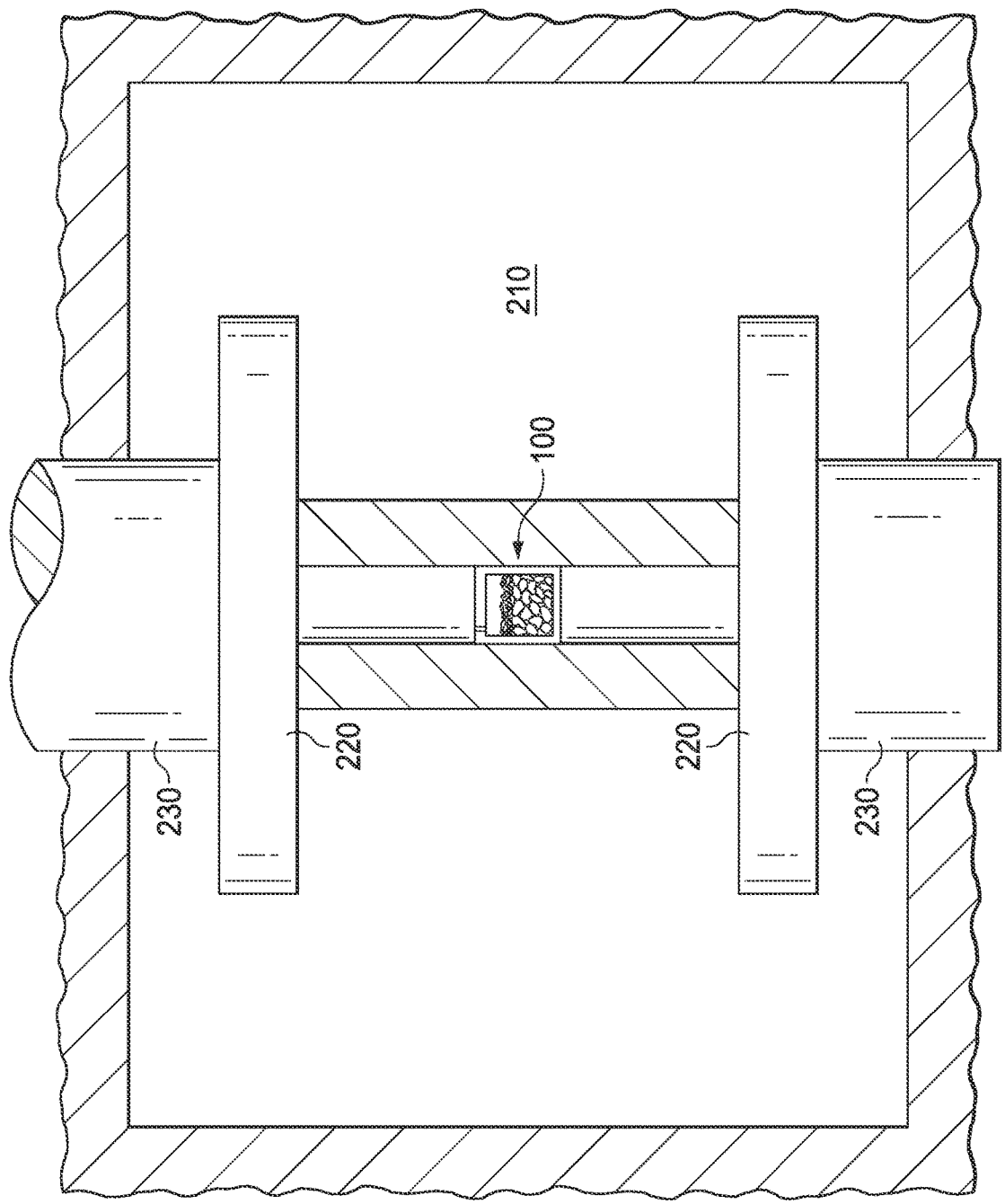
FIG. 3 is a schematic drawing of a spark plasma sintering system containing the assembly of FIG. 2.

During spark plasma sintering (also sometimes referred to as field assisted sintering technique or pulsed electric current sintering) a sintering assembly, such as assembly 100 of FIG. 2, is placed in a spark plasma sintering system, such as system 200 of FIG. 3. Spark plasma sintering system 200 includes vacuum chamber 210 that contains assembly 100 as well as conductive plates 220 and at least a portion of presses 230.

Presses 230 apply pressure to sintering can 100. The pressure may be up to 100 MPa, up to 80 MPa, or up to 50 MPa. Prior to or after pressure is applied, vacuum chamber 210 may be evacuated or filled with an inert gas. If sintering can 100 is filled with reactant gas 80 and sealed in vacuum chamber 210, then before substantial pressure is applied, chamber 210 is evacuated and filled with reactant gas, then port 120 is sealed. Pressure may be applied before or after chamber 210 is evacuated again and/or filled with inert gas.

After vacuum chamber 210 is prepared, a voltage and amperage is applied between electrically conductive plates 220 sufficient to heat reactant gas 80 to a temperature at which reactant gas 80 within pores 50 and 70 forms a plasma. For example, the temperature of the reactant gas may be 1500° C. or below, 1200° C. or below, 700° C. or below, between 300° C. and 1500° C., between 300° C. and 1200° C., or between 300° C. and 700° C. The temperature may be below 1200° C. or below 700° C. to avoid graphitization of diamond in polycrystalline diamond 30.

The voltage and amperage are supplied by a continuous or pulsed direct current (DC). The current passes through electrically conductive components of assembly 100, such as sealed sintering can 110 and, if electrically conductive, polycrystalline diamond 30 and/or substrate 40. The current density may be at least $0.5 \times 10^2$ A/cm$^2$, or at least $10^2$ A/cm$^2$.

The amperage may be at least 600 A, as high as 6000 A, or between 600 A and 6000 A. If the current is pulsed, each pulse may last between 1 millisecond and 300 milliseconds.

The passing current heats the electrically conductive components, causing reactant gas 80 to reach a temperature, as described above, at which it forms a plasma. The plasma formed from reactant gas 80 contains reactive species, such as atomic hydrogen, protons, methyl, carbon dimmers, and metal ions, such as titanium ions ($Ti^{4+}$), vanadium ions ($V^{4+}$), and any combinations thereof. The reactive species derived from hydrogen gas or hydrocarbon gas form diamond bonds 90. The metal reactive species form carbide structures 100. Diamond bonds 90 and/or carbide structures 100 may covalently bond to diamond grains 10.

Because spark plasma sintering heats assembly 100 internally as the direct current passes, it is quicker than external heating methods for forming a plasma. Assembly 100 may also be pre-heated or jointly heated by an external source, however. The voltage and amperage may only need to be applied for 20 minutes or less, or even for 10 minutes or less, or 5 minutes or less to form spark plasma sintered polycrystalline diamond. The rate of temperature increase of assembly 100 or a component thereof while the voltage and amperage are applied may be at least 300° C./minute, allowing short sintering times. These short sintering times avoid or reduce thermal degradation of the polycrystalline diamond.

Figure 4A:
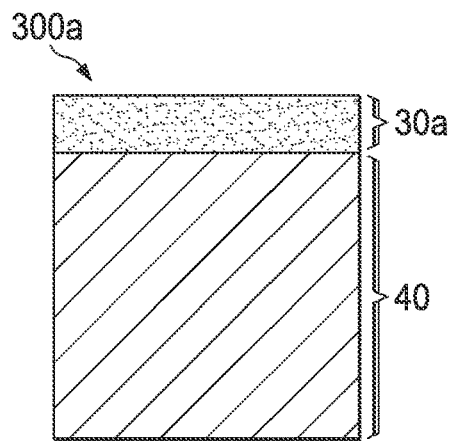
FIG. 4A is a schematic drawing of a cross-section of a spark plasma sintered polycrystalline diamond compact (PDC) cutter.
Figure 4B:
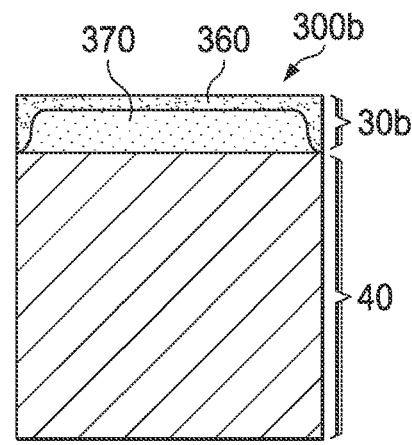
FIG. 4B is a schematic drawing of a cross-section of another spark plasma sintered PDC cutter.

The resulting PDC containing covalently bonded polycrystalline diamond 30 and substrate 40 may in the form of a cutter 300 as shown in FIG. 4A and FIG. 4B.

Polycrystalline diamond cutter 300a shown in FIG. 4A contains a substrate 40 and spark plasma sintered polycrystalline diamond 30a. Spark plasma sintered polycrystalline diamond 30a was formed from leached polycrystalline diamond in which the entire polycrystalline diamond was leached, such as thermally stable polycrystalline diamond, allowing the entire polycrystalline diamond 30a to be filled with reactant gas 80 during spark plasma sintering, resulting in the entire polycrystalline diamond 30a being spark plasma sintered polycrystalline diamond. Although substrate 40 in FIG. 4A may be the substrate used while forming polycrystalline diamond 40, it may also will be a subsequent substrate to which the polycrystalline diamond was attached after leaching.

Polycrystalline diamond cutter 300b shown in FIG. 4B contains a substrate 40 and spark plasma sintered polycrystalline diamond 30b. Polycrystalline diamond 30b contains a filled portion 360 in which at least some pores resulting from leaching are at least partially filled with diamond bonds and/or carbide structures formed by spark plasma sintering. Polycrystalline diamond 30b further contains an unleached portion 370 in which at least a portion of the diamond sintering aid remains and which are not filled by diamond bonds and/or carbide structures. Filled portion 360 extends to a depth D from the working surface of polycrystalline diamond cutter 300b. The depth D corresponds to the depth to which polycrystalline diamond 30b was leached prior to spark plasma sintering. Although substrate 40 may be a subsequent substrate to which the polycrystalline diamond was attached after leaching, it may also be the substrate used while forming polycrystalline diamond 30b.

Although FIG. 4B depicts a sharp line between filled portion 360 and unleached portion 370 to provide a simplified illustration of the concept, leaching does not actually result in a sharp line at which diamond sintering aid removal ceases. Typically the amount of diamond sintering aid removal gradually tapers off, such that surrounding depth D, polycrystalline diamond 30b would contain some pores at least partially filled with catalyst, some pores at least partially filled with diamond bonds and/or carbide structures, and even some pores filled with both catalyst and diamond bonds and/or carbide structures. Furthermore, diamond bonds and/or carbide structures may be located in polycrystalline diamond even at depths where no diamond sintering aid has been removed because unleached diamond may also contain pores.

Although the interface between polycrystalline diamond 30 and substrate 40 is shown as planar in FIG. 4A and FIG. 4B, the interface may have any shape and may even be highly irregular. In addition, although PDC cutter 300 is shown as a flat-topped cylinder in FIG. 4A and FIG. 4B, it may also have any shape, such as a cone or wedge. Polycrystalline diamond 30 and/or substrate 40 may conform to external shape features. Furthermore, although polycrystalline diamond 30 and substrate 40 are illustrated as generally uniform in composition, they may have compositions that vary based on location. For instance, polycrystalline diamond 30 may have regions with different levels of leaching or different diamond grains (as described above), including different grain sizes in different layers. Substrate 40 may include reinforcing components, and may have carbide grain of different sizes.

Figure 5:
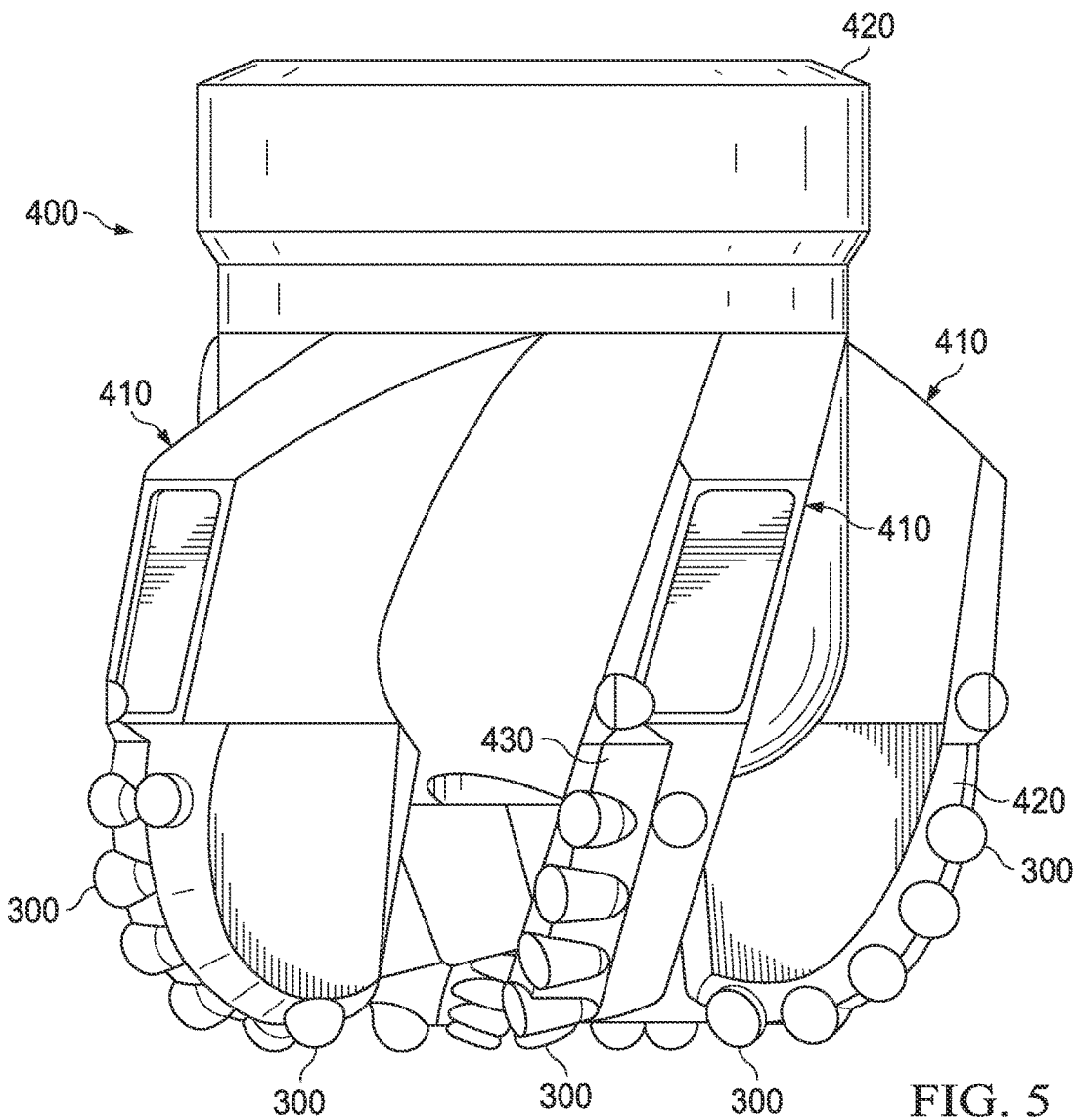
FIG. 5 is a schematic drawing of a fixed cutter drill bit containing a spark plasma sintered PDC cutter.

A PDC cutter such as cutter 300 may be incorporated into an earth-boring drill bit, such as fixed cutter drill bit 400 of FIG. 5. Fixed cutter drill bit 400 contains a plurality of cutters coupled to drill bit body 420. At least one of the cutters is a PDC cutter 300 as described herein. As illustrated in FIG. 5, a plurality of the cutters are cutters 300 as described herein. Fixed cutter drill bit 400 includes bit body 420 with a plurality of blades 410 extending therefrom. Bit body 420 may be formed from steel, a steel alloy, a matrix material, or other suitable bit body material desired strength, toughness and machinability. Bit body 420 may also be formed to have desired wear and erosion properties. PDC cutters 300 may be mounted on blades 410 or otherwise on bit 400 and may be located in gage region 430, or in a non-gage region, or both.

Drilling action associated with drill bit 400 may occur as bit body 420 is rotated relative to the bottom of a wellbore. At least some PDC cutters 300 disposed on associated blades 410 contact adjacent portions of a downhole formation during drilling. These cutters 300 are oriented such that the polycrystalline diamond contacts the formation.

Spark plasma sintered PDC other than that in PCD cutters may be attached to other sites of drill bit 400 or other earth-boring drill bits. Suitable attachment sites include high-wear areas, such as areas near nozzles, in junk slots, or in dampening or depth of cut control regions.

The present disclosure provides an embodiment A relating to a method of spark plasma sintering polycrystalline diamond by placing leached polycrystalline diamond comprising pores formed by catalyst removal during leaching and a reactant gas in an assembly, then applying to the assembly a voltage and amperage sufficient to heat the reactant gas to a temperature of 1500° C. or less at which the reactant gas forms a plasma, which plasma forms diamond bonds, carbide structures, or both in at least a portion of the pores.

The present disclosure provides an embodiment B relating to a spark plasma sintered polycrystalline diamond including a leached polycrystalline diamond including diamond bonds, carbide structures, or both in at least 25% of pores formed by catalyst removal during leaching. The spark plasma sintered polycrystalline diamond may be formed using the method of embodiment A.

The present disclosure provides an embodiment C relating to a PDC containing a spark plasma sintered polycrystalline diamond, such as that of embodiment B or formed using the method of embodiment A, bound to a substrate.

The present disclosure provides an embodiment D relating to a fixed cutter drill bit containing a bit body and a PDC of embodiment C.

Embodiments A, B, C, and D may be combined with any of the following additional embodiments, unless clearly mutually exclusive: i) less than 2% of the volume of the leached polycrystalline diamond may be occupied by a diamond sintering aid; ii) the reactant gas may include a carbide-forming metal in gas form; ii-a) the carbide-forming metal in gas form may include a metal salt; ii-b) the plasma may include metal ions; iii) the reactant gas may include a hydrogen gas; iii-a) the plasma may include atomic hydrogen, a proton, or a combination thereof; iv) the reactant gas may include a hydrocarbon gas; iv-a) the hydrocarbon gas may include methane, acetone, methanol, or any combinations thereof; iv-b) the plasma may include methyl, carbon dimmers, or a combination thereof; v) the reactant gas may include any two of a carbide-forming metal in gas form, a hydrogen gas, and a hydrocarbon gas; vi) the temperature may be 1200° C. or less; vii) the temperature may be 700° C. or less; viii) the voltage and amperage may be supplied by a continuous direct current or a pulsed direct current; ix) the voltage and amperage may be applied for 20 minutes or less; x) the sintering can, polycrystalline diamond, reactant gas, or any combination thereof may have a rate of temperature increase while the voltage and amperage are applied of least 300° C./minute; xi) diamond bonds, carbide structures, or both may be formed in at least 25% of the pores of the polycrystalline diamond; xii) the spark plasma sintered polycrystalline diamond may have a higher impact strength than the leached polycrystalline diamond.

Although the present disclosure and its advantages have been described in detail, it should be understood that various changes, substitutions and alternations can be made herein without departing from the spirit and scope of the disclosure as defined by the following claims.

What is claimed is:

1. A spark plasma sintering method comprising:
    placing leached polycrystalline diamond comprising pores formed by catalyst removal during leaching and a reactant gas comprising a hydrogen gas in an assembly; and
    applying to the assembly a voltage and amperage sufficient to heat the reactant gas to a temperature of 1500° C. or less at which the reactant gas forms a plasma, which plasma forms diamond bonds, carbide structures, or both in at least a portion of the pores, wherein the assembly or any component thereof has a rate of temperature increase while the voltage and amperage are applied of at least 300° C./minute.

2. The method of claim 1, wherein less than 2% of the volume of the leached polycrystalline diamond is occupied by a diamond sintering aid.

3. The method of claim 1, wherein the reactant gas comprises a carbide-forming metal in gas form and wherein the plasma comprises metal ions.

4. The method of claim 3, wherein the carbide-forming metal in gas form comprises a metal salt.

5. The method of claim 1, wherein the plasma comprises atomic hydrogen, a proton, or a combination thereof.

6. The method of claim 1, wherein the reactant gas further comprises a carbide-forming metal in gas form or a hydrocarbon gas.

7. The method of claim 1, wherein the temperature is 1200° C. or less.

8. The method of claim 1, wherein the voltage and amperage are supplied by a continuous direct current or a pulsed direct current.

9. The method of claim 1, wherein the voltage and amperage are applied for 20 minutes or less.

10. A spark plasma sintering method comprising:
    placing leached polycrystalline diamond comprising pores formed by catalyst removal during leaching and a reactant gas comprising a hydrocarbon gas in an assembly; and
    applying to the assembly a voltage and amperage sufficient to heat the reactant gas to a temperature of 1500° C. or less at which the reactant gas forms a plasma, which plasma forms diamond bonds, carbide structures, or both in at least a portion of the pores, wherein the assembly or any component thereof has a rate of temperature increase while the voltage and amperage are applied of at least 300° C./minute.

11. The method of claim 10, wherein less than 2% of the volume of the leached polycrystalline diamond is occupied by a diamond sintering aid.

12. The method of claim 1, wherein the reactant gas comprises a carbide-forming metal in gas form and wherein the plasma comprises metal ions.

13. The method of claim 12, wherein the carbide-forming metal in gas form comprises a metal salt.

14. The method of claim 10, wherein the hydrocarbon gas comprises methane, acetone, methanol, or any combinations thereof and wherein the plasma comprises methyl, carbon dimmers, or a combination thereof.

15. The method of claim 10, wherein the reactant gas further comprises a carbide-forming metal in gas form or a hydrogen gas.

16. The method of claim 10, wherein the temperature is 1200° C. or less.

17. The method of claim 10, wherein the voltage and amperage are supplied by a continuous direct current or a pulsed direct current.

18. The method of claim 10, wherein the voltage and amperage are applied for 20 minutes or less.

* * * * *